No. 850,981. PATENTED APR. 23, 1907.
C. C. TILLOTSON.
POWER TRANSMISSION CLUTCH.
APPLICATION FILED OCT. 3, 1906.
Fig. 1.
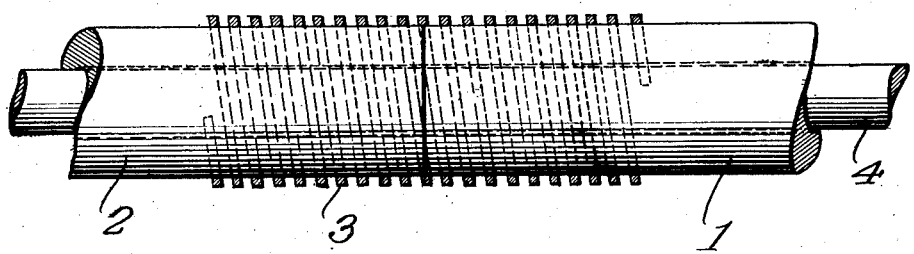
Fig. 3.
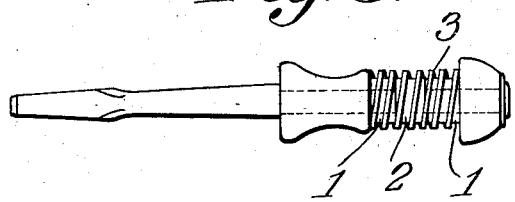
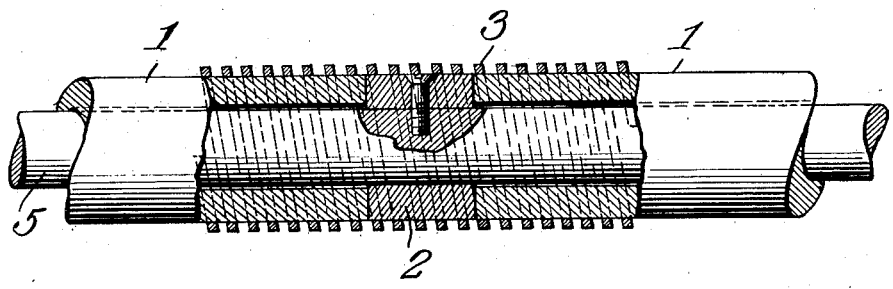
Fig. 2.
WITNESSES:
Charles C. Tillotson,
INVENTOR.
ATTORNEYS

UNITED STATES PATENT OFFICE.

CHARLES C. TILLOTSON, OF OLATHE, KANSAS.

POWER-TRANSMISSION CLUTCH.

No. 850,981.　　　　Specification of Letters Patent.　　　Patented April 23, 1907.

Application filed October 3, 1906. Serial No. 337,241.

*To all whom it may concern:*

Be it known that I, CHARLES C. TILLOTSON, a citizen of the United States, residing at Olathe, in the county of Johnson and State of Kansas, have invented a new and useful Power-Transmission Clutch, of which the following is a specification.

This invention has relation to power-transmission clutches; and it consists in the novel construction and arrangement of its parts, as hereinafter shown and described.

The object of the invention is to provide a clutch which consists, primarily, of two shafts or rotary members embraced within a coil-spring. As reciprocatory rotary movement is applied to one of the said shafts rotary movement is transmitted through the said coil-spring to the other shaft, which is rotated in one direction only, the volutions of the said spring contracting and gripping the said shaft as the driving-shaft is turned in one direction and expanding and releasing the shafts as the driving-shaft is turned in the opposite direction.

The clutch may be used to advantage upon screw-drivers, bit-braces, lawn-mowers, coaster-brakes for bicycles, micrometer-calipers, and many other devices where it is desirable or essential to transmit a reciprocatory or intermittent rotary movement to a shaft which is intended to rotate in one direction only.

In the accompanying drawings, Figure 1 is a side elevation of one form of the invention, partly in section. Fig. 2 is a side elevation of another form of the invention, partly in section; and Fig. 3 is a side elevation of a screw-driver, showing the power-transmission clutch applied thereto.

The power-transmission clutch comprises the driving shaft or member 1, which is alined with the driven shaft or member 2, The volutions of the coil-spring 3 embrace the ends of said shafts. The said shafts 1 and 2 may be hollow and the rod 4 may pass through the said shafts for the purpose of keeping them in proper alinement.

In the form of the invention as illustrated in Fig. 1 when reciprocatory or intermittent rotary movement is applied to the driving-shaft 1 the volutions of the spring 3 contract about the said shafts 1 and 2 as the shaft 1 rotates to the right, and consequently the shaft 3 rotates to the right with the said shaft 1. However, when the shaft 1 rotates to the left the volutions of the spring 3 expand and the shaft 2 may continue to rotate to the right or may come to a state of rest.

In the form of the invention as illustrated in Fig. 2 the shaft or rotating member 2 is provided with the extension 5, which passes through the interiors of the shafts 1 1, the last said shafts being duplicated in this form of the invention. Thus as the intermittent or rotary movement is applied to shaft 1 at the right the shaft 2 will be turned in one direction, while when the intermittent or reciprocatory rotary movement is applied to the shaft 1 to the left the said shaft 2 will be rotated in the opposite direction.

Fig. 3 illustrates the form of the invention, as shown in Fig. 2, applied to a screw-driver.

It will be observed that the driving and driven shafts and the coil-spring 3 are devoid of positive attaching means, and consequently either of the shafts 1 or 2, as shown in Fig. 1, may act as the driving-shaft when the other will be the driven shaft. In a like manner either of the shafts 1 or 2, as shown in Fig. 2, may act as the driving-shaft. When shaft 2 is the driving-shaft, one of the shafts 1 will be turned in one direction, while the other shaft 1 may turn in the opposite direction.

Having described my invention, wha I claim as new, and desire to secure by Letters Patent, is—

1. A clutch comprising rotary members and a voluted spring member embracing the aforesaid members and engaging the same frictionally only.

2. A clutch comprising a trinity of alined rotary members and a voluted spring member embracing the aforesaid members and engaging the same frictionally only.

3. A clutch comprising a trinity of alined rotary members and a voluted spring member embracing the aforesaid members and engaging the same frictionally only, said spring member extending along the entire length of the mean rotary member and having its end portions located upon the extreme rotary members.

In testimony that I claim the foregoing as my own I have hereto affixed my signature in the presence of two witnesses.

CHARLES C. TILLOTSON.

Witnesses:
CYRUS A. POTTS,
JACOB M. STOLTZFUS.